United States Patent Office 2,916,352
Patented Dec. 8, 1959

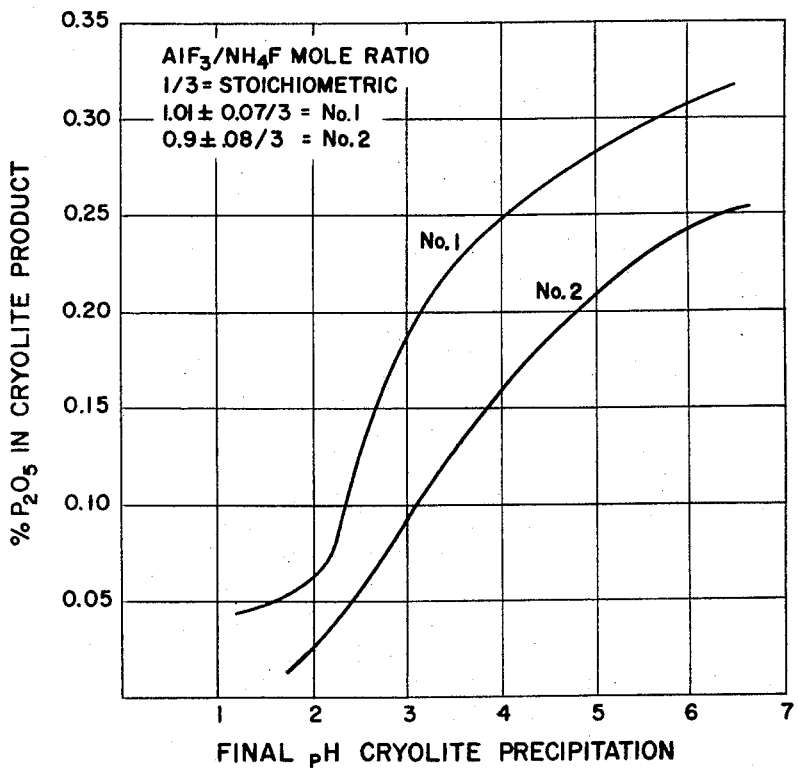

2,916,352

ARTIFICIAL CRYOLITE PROCESS

Frederick T. Fitch and James E. Armstrong, Baltimore, Md., assignors to W. R. Grace & Co., New York, N.Y., a corporation of Connecticut Application September 14, 1956, Serial No. 609,863

5 Claims. (Cl. 23—88)

This invention relates to the preparation of artificial double salts of fluorine. In one specific aspect it relates to an improved process for the manufacture of artificial cryolite. In another aspect, it relates to the preparation of an improved artificial cryolite that is competitive with the refined natural product from the standpoint of purity.

The art of synthetic cryolite manufacture is well established. It has been common practice to prepare this material by such various processes as reacting sodium aluminate and hydrofluoric acid; reacting aqueous solutions of aluminum fluoride and sodium fluoride; reacting aqueous solutions of aluminum fluoride, sodium chloride and hydrofluoric acid; or reacting aqueous solutions of aluminum fluoride, ammonium fluoride, and sodium chloride. The solution chemistry involving the primary reactants is relatively straightforward; accordingly, many variations of the above-mentioned processes have been developed. As indicated, aqueous aluminum fluoride is commonly used as a source of aluminum ions in the preparation of cryolite. It has been found possible to prepare solutions of this difficultly soluble material by the reaction of hydrofluoric acid and aluminum hydrate. It was noted on an early day that upon standing aluminum fluoride converts to an insoluble form; a form that is insoluble in both acid and water. Sodium fluoride and ammonium fluoride are common fluorine-supplying compounds that can be reacted in solution with aluminum fluoride to produce a double salt complex. If the latter of these two compounds is used it is then necessary to further treat the reaction mixture with a compound supplying sodium ions by simple metathesis, e.g., sodium chloride or sodium carbonate, to produce cryolite, $Na_3AlF_6$.

The foregoing prior art processes cannot be altogether acquitted of undesirability. Unless raw materials of the highest purity are selected, the resulting artificial cryolite is unsuitable for its principal use; viz: as a flux for aluminum-containing ores in the preparation of aluminum metal. In addition, pure hydrofluoric acid is an expensive raw material from which to prepare artificial cryolite. Since the supply of natural cryolite is constantly dwindling and the aluminum industry is on the other hand undergoing considerable expansion, large quantities of synthetic cryolite of high purity must be made commercially available. An artificial cryolite substantially free of silica has been obtained from an impure solution of sodium fluoride and an impure solution of aluminum fluoride by acidifying the sodium fluoride solution to a pH of about 3.5 before admixture with the aluminum fluoride solution. Cryolte is thereafter precipitated by the reaction of the two solutions, and it is recovered as a substantially silica-free product. This process has inherent limitations. It is noted that cryolite free of silica cannot be produced by this method either by acidifying the aluminum fluoride solution or by adding the acid to the solutions after the precipitation for the reason that when the silica has precipitated it is very difficult if not impossible to redissolve it. Of greater significance, however, is the fact that cryolite prepared by this method still contains about 0.10 to 0.23% of phosphorus (expressed as $P_2O_5$) impurity depending upon reaction conditions (compare Fig. 1). This seemingly innocuous quantity of $P_2O_5$ has pronounced deleterious effect on the current efficiency of reduction pots in the aluminum industry. Tests on commercial scale equipment have clearly demonstrated that for each 0.01% $P_2O_5$ impurity in the cryolite flux there is from 1–1.5% reduction in the current efficiency of the pots. The presence of $P_2O_5$ in the aluminum pot is of such concern that it is common practice in the aluminum industry to control the phosphorus content of the alumina (which is obviously present in greater quantities than cryolite during reduction) shipped to the reduction plants at 0.002–0.003% $P_2O_5$. Apparently, the harmful effects of phosphorus and other impurities in the cryolite flux is more pronounced during the start-up of an aluminum pot. For this reason, natural cryolite is used in the start-up and this relatively pure material is supplemented by synthetic cryolite after the pot line has been brought on stream. No artificial cryolite of sufficient purity has been made to supplement the use of natural cryolite in reduction pot start-up. Even using the improved silica-free artificial cryolite a 10–35% loss in current efficiency would be experienced during an aluminum pot start-up. Such an operation is commercially prohibitive.

Artificial cryolite has an additional disadvantage. It is difficult to produce a substantially white product resembling natural cryolite. Discoloration in artificial cryolite is an empirical yardstick of the general level of trace impurities. When a high purity product is needed for processing operations, commercial manufacturers are reticent to substitute for natural cryolite the reddish or mouse-grey colors ordinarily produced by the prior art processes. We have discovered novel improvements in the art of manufacture of artificial cryolite that result in a substantially white impurity free product equivalent in every way to the refined natural product.

It is therefore an object of the present invention to provide a novel technique whereby a substantially white impurity-free artificial cryolite which is chemically equivalent to the naturally occurring substance is produced.

The present invention is concerned with the production of artificial cryolite from raw materials containing phosphorus oxides or other compounds of phosphorus as an impurity. Bauxite, a relatively inexpensive source of alumina, is such a material. Fluosilicic acid, a by-product of the acidulation of phosphate rock, is an important source of low-cost fluorine. It is, of course, well known that this useful acid contains trace quantities of phosphorus, either in the form of colloidal $P_2O_5$, or more probably, in the form of the acid, $H_3PO_4$. Impure hydrofluoric acid and impure aluminiferous materials other than bauxite also contain this undesirable contaminant.

We have previously indicated that the solution chemistry of cryolite is well established. The essence of our invention is involved in the careful control of the side reactions involved in the formation and precipitation of the double salt. More specifically, we are concerned with the control of the complex side reactions of the salts and acids of phosphorus and fluorine, and heavy metal complexes such as those formed from iron and titania. We have previously indicated that the double fluoride may be precipitated initially as cryolite itself, $Na_3AlF_6$ or as ammonium cryolite $(NH_4)_3AlF_6$ which readily undergoes simple metathesis to form sodium aluminum fluoride. Our invention, then, resides in controlling the reaction conditions in impure solutions where aluminum fluoride is contacted with a compound or compounds supplying sodium and fluoride ions.

Aluminum fluoride for the purposes of the present invention is preferably prepared by reacting bauxite and fluosilicic acid according to Equation I shown hereunder:

(I) $Al_2O_3 + H_2SiF_6 \rightarrow 2AlF_3 + SiO_2 + H_2O$

This method of obtaining a maximum yield of relatively silica-free aluminum fluoride solution is described in the co-pending application of Edwin M. Glocker, application Serial No. 299,938, filed July 21, 1952, now abandoned. Using the Glocker process, bauxite and fluosilicic acid are contacted for a predetermined time at a predetermined temperature until the point of maximum solubility of aluminum fluoride is reached. Thereafter, the solution is immediately filtered and washed free of the filter cake resulting in an aluminum fluoride solution which will remain as such without the crystallization of insoluble aluminum fluoride for a period of about three hours. Obviously, other impure aluminiferous materials could be used for our purposes in lieu of the bauxite as a raw material. It is equally obvious that other fluorine-containing acids such as HF could be used in the production of aluminum fluoride.

In order to prepare cryolite using an aqueous solution of aluminum fluoride as a basic raw material we have a choice of two well known alternatives. In one possibility, we may contact the aluminum fluoride solution with sodium fluoride thus supplying sodium and fluoride ions to the reaction mixture concomitantly. Secondly, we may react $AlF_3$ with $NH_4F$ to produce the white precipitate, ammonium cryolite, and subsequently treat the reaction mixture with a sodium-containing compound capable of undergoing simple metathesis with ammonium cryolite to produce sodium aluminum fluoride. Common examples of compounds suitable for this purpose are sodium chloride and sodium carbonate. While we have found it preferable from an economic standpoint to make cryolite via the ammonium cryolite route, any of the aforementioned solution reactions or their common chemical equivalents are applicable to our process. The advantages of the present invention are realized in the production of cryolite in aqueous solutions from raw materials contaminated with trace impurities of phosphorus or its compounds and salts of heavy metals.

Conditions necessary for the production of a substantially impurity-free cryolite from raw materials containing phosphatic and heavy metal impurities by the reaction of such materials in aqueous solution will become apparent from the following description, when read in connection with the accompanying drawing in which: the figure shows the percent phosphorus containing impurity (expressed as $P_2O_5$) in the final cryolite product, where the final pH of the cryolite precipitation step is compared for various aluminum fluoride-ammonium fluoride-sodium chloride reaction mixtures containing different mole ratios of aluminum fluoride to ammonium fluoride.

Before discussing the figure in detail, an explanation of the principal reaction resulting in the formation of the insoluble double salt and the many side reactions related thereto is appropriate. In the interest of clarity, we will confine our discussion primarily to the reaction as it occurs by the preferred route; viz: that shown in Equations II and III below.

(II) $AlF_3 + 3NH_4F \rightarrow (NH_4)_3AlF_6$
(III) $(NH_4)_3AlF_6 + 3Na^+ \rightarrow 3NH_4^+ + Na_3AlF_6$ Thus, simply stated, is the primary reaction. Aluminum fluoride and ammonium fluoride are reacted in aqueous solution, thereby precipitating ammonium cryolite. By simple metathesis ammonium cryolite is converted into the more widely known and useful sodium salt. The reaction is preferably conducted at elevated temperatures below the boiling point of the reaction mixture (about 200° F.), since ammonium cryolite and sodium cryolite to a limited extent are soluble in cold water. The reaction mixture should be allowed to digest for a sufficient time, generally speaking, about 30–45 minutes, to permit the reaction to go to completion. The solution is subsequently filtered or centrifuged and artificial cryolite is recovered therefrom. We have discovered that side reactions involving phosphorus and heavy metal impurities that occur during the reaction are closely related to the stoichiometric proportions of the reactants and the final pH of the reaction mixture. Equation II shows that 1 mole of aluminum fluoride reacts with 3 moles of ammonium fluoride to produce ammonium cryolite. We have found that if the stoichiometry is varied slightly, say using 0.98 mole aluminum fluoride to 3 moles of ammonium fluoride, that the amount of phosphorus in the final product (expressed as $P_2O_5$) is substantially reduced. The deleterious effects of trace quantities of this undesirable impurity have already been thoroughly described. We have also found that, by lowering the pH of the reaction mixture to minimize the concentration of OH ions at all times during the reaction, cryolite substantially free of phosphorus-containing impurities can be produced. We note that the final pH (See Equation III and Figure 1) of the cryolite precipitation step should be below about a pH of 2 under the preferred $<\frac{1}{3} AlF_3/NH_4F$ mole ratio or below about a pH of 1 under uncontrolled conditions of stoichiometry. By the term "about" we mean $\pm 0.3$ pH which would be the normal variation expected using raw materials containing greater or lesser amounts of impurities. By the term "uncontrolled" we mean indiscriminate addition of $AlF_3$ to $NH_4F$ in approximately a 1:3 mole ratio. "Final pH" means a pH measured after all the reactants have been added; in other words in the mixture where $Na_3AlF_6$ is formed.

The following mechanism, which may be further complicated by additional side reactions, serves to illustrate our point. Phosphorus exists in the ammonium fluoride and aluminum fluoride solutions as $H_3PO_4$ or as phosphate salts. In the acidic aluminum fluoride solution, it is probable that it is present as $H_3PO_4$ since the presence of excess hydrogen ions tends to repress ionization (Equation IV).

(IV) $H_3PO_4 \rightarrow 3H^+ + PO_4^\equiv$

The major quantity of phosphorus impurity will come from the aluminum fluoride solution because the starting raw material bauxite often contains as high as from 2 to 3% $P_2O_5$. The addition of excess ammonium fluoride, which is tantamount to providing a small amount of free ammonium fluoride in the reaction mixture, prevents the formation of insoluble tertiary phosphates by forming soluble complexes with $Fe^{+++}$, $TiO^{++}$ and other heavy metals which would otherwise precipitate as phosphates and contaminate the cryolite product (Equations V and VI).

(V) $Fe^{+++} + 6NH_4^+ + 6F^- \rightarrow FeF_6^\equiv + 6NH_4^+$
(VI) $TiO^{++} + 2H^+ + 6F^- \rightarrow TiF_6^= + H_2O$ First of all, the acid exhibits a buffering action which represses the ionization of $H_3PO_4$, tending to limit the coprecipitation of the heavy metal phosphates with the double salt precipitate. Second, excess $NH_4F$ preferentially reacts with heavy metals to form soluble complexes, e.g. $FeF_6^\equiv$, $TiF_6^=$, which are readily dissolved in acid media. It is known of course that phosphoric acid reacts with heavy metals such as iron according to Equation VII. The extremely insoluble ferric phosphate and its highly colored isomeric form are the end products of this reaction.

(VII) $4Fe^{+++} + 12H^+ + 4PO_4$
$\rightarrow 2FePO_4\downarrow + Fe[Fe(PO_4)_2]\downarrow + 12H^+$ Hydrolysis of this latter compound gives a complex molecule of the probable structure of the product of Equation VIII.

(VIII) $Fe[Fe(PO_4)_2] + 8HOH$
$\rightarrow Fe(OH)_3 \cdot H_3[Fe(PO_4)_2] \cdot 5H_2O$ Such heavy metal phosphates are voluminous unoriented colloidal precipitates which are difficultly soluble in acid. While they may be decomposed by concentrated sulfuric acid, such decomposition does not readily obtain in dilute aqueous solutions. Once the complex ferric, titanic, or aluminum phosphates are formed, they are virtually impossible to remove. Acid is therefore added to the reaction mixture in order to maintain therein at all times free hydrogen ions. Obviously, the simplest way to accomplish this objective is to add the acid to one or the other of the reactants before the precipitation of ammonium cryolite. Thus, in practice we have found that by adding to the ammonium fluoride solution a quantity of acid sufficient to reduce the pH thereof to about 6 prior to admixing it with the aluminum fluoride, we can produce a final reaction mixture having a pH of about 2 or below. This pH is sufficient to prevent the formation of trace quantities of difficultly soluble complex phosphates using our preferred method of controlled stoichiometry. Strong mineral acids such as hydrochloric or sulfuric are quite suitable for our purpose. Comparable quantities of acid would reduce the pH of the $AlF_3$ solution to below about 1 if it was found desirable to pretreat this reactant in lieu of the $NH_4F$.

Further reference to the stoichiometry of the reaction mixture shows the advisability of having an excess of the required amount of ammonium fluoride. If aluminum fluoride is in excess, the reaction shown in Equation IX will occur.

(IX)    $Al^{+++} + PO_4^{\equiv} \rightarrow AlPO_4\downarrow$

Colloidal aluminum phosphate, which is practically insoluble except in concentrated acids, is formed as a result of this slight alteration of the stoichiometry. If the stoichiometry is not controlled to repress the formation of this colloidal material, the final pH must be lowered to below about pH 1 to remove it. The formation of this undesirable aluminum salt is not entirely predicated on the stoichiometry since there may be buffering actions to offset the reaction between aluminum and the phosphate ion. It is known, of course, that addition of hydroxide ions to acid solutions containing phosphate and alkali metal ions causes immediate precipitation of tertiary phosphates. Such a situation obtains when a mildly acid aluminum fluoride solution is added to a basic aluminum fluoride solution containing inherently some ammonium hydroxide. All tertiary phosphates of heavy metals are stable to water. The more complex ones, especially those of iron, are even stable in acid solutions and require treatment in strong concentrated acids to dissolve them. Once any complex heavy metal phosphate is precipitated there is a tendency for it to become occluded in the cryolite precipitate. Hence, hydrogen ions must be present in excess at all times in the reaction mixture to repress any harmful action caused by hydroxide ions. Once the reaction has been allowed to take place the subsequent addition of acid in any amount has no demonstrable effect upon the amount of impurity remaining in the cryolite product. The amount of trace impurity in cryolite resulting from uncontrolled reactions in neutral or slightly acidic aqueous solution ranges from 0.25 to 0.30. It should be noted from our previous discussion that at such levels of phosphorus content, a 25–50% loss of current efficiency in experienced if the cryolite is used for starting up an aluminum pot.

Referring once again to Figure 1, curve No. 1 shows the effect of the final cryolite precipitation pH on the amount of phosphorus (expressed as $P_2O_5$) in the cryolite product for a reaction mixture rich in $AlF_3$. It is observed that under these conditions the pH must be reduced to about 1 or below to obtain a product having less than about 0.05% $P_2O_5$ therein. Such a product is of borderline utility in the production in starting up an aluminum pot. Curve No. 2 shows the level of $P_2O_5$ in the final product where the reaction mixture was rich in $NH_4F$. Under these conditions it is interesting to note that about pH of 2 or below, a product is obtained having less than 0.03% $P_2O_5$ therein. Such a product is comparable to natural cryolite in its performance in aluminum reduction.

The principal mechanism hereinbefore described does not preclude the possibility of additional side reactions occurring in the reaction mixture. For example, such complex ions as $(NH_4)PO_2F_2$, $Na[Fe(H_2O)(H_2PO_2)_5]$, $[Fe_3(HO)(H_2PO_2)_6](H_2PO_2)_2 \cdot nH_2O$, $(NH_3OH)H_2PO_2$, $[Fe_3(H_2PO_2)_6] \cdot (ClO_4)_2H_2PO_2 \cdot \frac{1}{2}H_3PO_2 \cdot 18H_2O$ $2Al(OH)_3 \cdot Al_2(HPO_3)_3$ and many others, are capable of formation, depending, of course, on the stoichiometry and the pH of the reaction mixture. The mechanism, however, explains on most logical grounds the result obtained by pH and stoichiometric control.

We have noted that sodium fluoride can be used in lieu of $NH_4F$ (Equation X).

(X)    $AlF_3 + 3NaF \rightarrow Na_3AlF_6$

By using a slight excess of NaF in acid medium the reaction of Equation XI obtains:

(XI)    $Fe^{+++} + 6Na^+ + 6F^- \rightarrow FeF_6^{\equiv} + 6Na^+$

Considerations of pH and stoichiometry hereinbefore described with reference to $AlF_3$—$NH_4F$—$Na^+$ reaction mixtures apply equally when NaF is used as a reactant.

After the double salt precipitate has been formed under controlled stoichiometric conditions, preferably at a pH of about 2 or below, the reaction mixture is digested at a temperature of about 200° for a period of about a half to three quarters of an hour to assure the completion of the reaction. If the initial precipitate is ammonium cryolite, sodium chloride or a comparable sodium ion supplying compound is added to the reaction mixture before the digestion step takes place. After the digestion step, the finely divided cryolite crystals are filtered or centrifuged free of the mother liquor and dried and calcined using techniques known to the prior art. In this regard, it is common practice to pre-dry the cryolite crystals at a low temperature, preferably about 250° F., either in an oven drier or rotary drier before calcination. The material is calcined at about 1100–1200° F. to remove the bound moisture contained therein which is considered undesirable in aluminum reduction. While the drying and calcination steps of the cryolite process are well known to the prior art, it is after calcination that an interesting and altogether wholesome effect of our novel process can be observed. Cryolite prepared by the conventional methods of solution chemistry appears reddish in color if the stoichiometry of the reaction was such that the aluminum fluoride was present in slight excess. This coloration is a direct result of the formation of complex salts of trace impurities, e.g., the isomeric phosphate $Fe(FePO_4)_2$. It has been observed that cryolite containing the same level of trace impurity may appear white or red depending upon the stoichiometry and pH of the precipitation step. It is obvious, then from the standpoint of trace impurities the color of the product is of little consequence. However, we must not be unmindful of the marketability of the product; a subject of acute interest to the manufacturers. While we have found that the color of the cryolite depends solely upon the form in which the trace impurities are present, it is quite true that to the untrained observer, the reddish or the more highly colored product, appears to contain a considerably higher amount of contaminants. Accordingly, white cryolite shows a clear advantage over discolored products, since it can be more readily sold to manufacturers requiring a high purity product.

A general comparison of commercially available reduction grade cryolite is appropriate at this point. In Table 1, chemical analyses of cryolite produced by the preferred embodiment of our novel process, artificial reduction grade cryolite produced from phosphate-free materials, and artificial cryolite made from impure materials by a prior art method without acidification or stoichiometric control, and natural cryolite, are shown.

TABLE 1
*Typical cryolite analyses*

| Component | Composition, Percent | | | |
|---|---|---|---|---|
| | Novel Process Cryolite | Natural Cryolite | Phosphate-Free Cryolite | Prior Art Cryolite |
| F | 52.48 | 53.25 | 49.00 | 52.31 |
| Na | 33.18 | 30.33 | 29.85 | 32.09 |
| Al | 12.91 | 12.68 | 12.80 | 12.80 |
| $P_2O_5$ | 0.03 | 0.03 | 0.034 | 0.25 |
| $Fe_2O_3$ | 0.021 | 0.023 | 0.056 | 0.086 |
| $TiO_2$ | 0.038 | 0.001 | | |
| $SiO_2$ | 0.26 | 0.21 | 1.40 | 0.52 |

It is clearly seen from Table 1 that our product is competitive with the refined natural material and an artificial product produced from more expensive processes which require phosphate-free materials. Our invention is further illustrated but not delimited by the following examples:

EXAMPLE I

A bauxite having the composition shown below in Table 2 was selected for the preparation of an aluminum fluoride solution.

TABLE 2
*Bauxite raw material*

Composition, percent
| | |
|---|---|
| $Al_2O_3$ | 59.87 |
| $SiO_2$ | 8.67 |
| $Fe_2O_3$ | 0.33 |
| $TiO_2$ | 1.30 |
| $P_2O_5$ | 2.90 |

753 grams of this material were contacted with 2,714 grams of $H_2SiF_6$ containing 16.21% F by weight for a period of 40 minutes at an average temperature of 160° F. After the reaction time had elapsed the slurry was immediately filtered and the filter cake was washed with 3 liters of water. The resulting solution, which was apparently clear except for the presence of trace quantities of colloidal particles, weighed 5,637 grams and contained 11.55% aluminum fluoride.

Concurrently with the aluminum fluoride preparation 2,714 grams of $H_2SiF_6$ (containing 16.7% F) were reacted with 1,508 grams of $NH_4OH$ solution containing 28% ammonia. The reaction mixture was slurried for 30 minutes under closed conditions maintaining therein a pH of about 8.9. The resulting ammonium fluoride solution was filtered free of silica and washed from the filter cake with 3 liters of water. The resulting solution weighed 6,148 grams and contained 13.4% ammonium fluoride. 100 ml. of concentrated sulfuric acid were added to this ammonium fluoride solution to reduce the pH from 8.9 to 6.1. The ammonium fluoride was admixed with the co-prepared aluminum fluoride to form ammonium cryolite which was allowed to digest for about 10 minutes. The $AlF_3/NH_4F$ mole ratio in the resulting mixture was 0.98/3. 7090 grams of 18.18% NaCl solution were then added thereto to form the sodium aluminum fluoride. The final pH of the cryolite mixture was 2.0. This mixture was allowed to digest for a period of about 45 minutes after which time the cryolite crystals were separated by filtration and washed free of impurities with 3 liters of water. The filtered material was oven-dried at 250° F. and calcined in a muffle at 1160° F. for approximately one hour. Analysis of the cryolite product showed the heavy metal and phosphatic impurities to be $Fe_2O_3$, 0.023%; $TiO_2$, 0.058%; $P_2O_5$, 0.02%.

EXAMPLE II

The procedure of Example I was substantially repeated. 5,479 grams of ammonium fluoride solution containing 14.45% $NH_4F$ were acidified to a pH of about 6.1 with the addition of 60 ml. of $H_2SO_4$. This solution was contacted with 5,312 grams of aluminum fluoride solution containing 11.9% $AlF_3$. The acidified reaction mixture contained therefore a 1.02/3 $AlF_3/NH_4F$ mole ratio. The final pH of the mix after the addition of the sodium chloride was 1.2. The $P_2O_5$ content of this material was 0.05, which indicated a considerable increase of this impurity over the procedure of Example I where the reaction mixture was rich in $NH_4F$.

EXAMPLE III

The procedure of Example II was substantially repeated using a reaction mixture having a slight stoichiometric excess of $AlF_3$ over the amount of $NH_4F$ present. The final pH of the mix was 1.6. The cryolite product contained 0.05% $P_2O_5$.

EXAMPLE IV

The procedure of Example I was substantially repeated using a solution containing an excess of ammonium fluoride (about 0.98/3) over the amount of aluminum fluoride present. 130 ml. of concentrated HCl were added to the $NH_4F$ before admixture of the solution. The final pH of the reaction mixture was 3.6. The resulting cryolite product had a $P_2O_5$ content of 0.10. It was noted that even using the improved technique of stoichiometric control the product thus obtained was unacceptable for aluminum reduction purposes. Compare Table 3, infra, where the final pH of an $AlF_3$ rich mixture (1.04/3) was 2.7 and the $P_2O_5$ content of the product was 0.17.

EXAMPLE V

The procedure of Example I was repeated using an impure hydrated alumina referred to commercially as precipitator scale. Identical quantities of reactants were used with the exception that the reaction mixture was acidulated to a final pH of 4.9 by the addition of 100 ml. of HCl to the ammonium fluoride before admixing the ammonium fluoride and aluminum fluoride solutions. The aluminum fluoride-ammonium fluoride mole ratio therein was 0.98/3. The $P_2O_5$ content of the product was 0.15%.

EXAMPLE VI

The procedure of Example V was repeated omitting the addition of HCl. The final pH of the reaction mixture was 7.9 and the resulting $P_2O_5$ content was 0.25.

In the foregoing examples it is noteworthy that the cryolite prepared from reaction mixtures containing a slight excess of ammonium fluoride over the aluminum fluoride present were white or nearly white in appearance. Those products resulting from solutions containing an excess of the aluminum fluoride ranged in color from deep buff to dark red.

EXAMPLE VII

Additional tests (some of which were used in preparing the curves of Figure 1) are summarized hereunder in Table 3.

TABLE 3
*Relationship of pH and stoichiometry to color and purity of artificial cryolite*

| Final pH Cryolite Mix | $AlF_3/NH_4F$ Mole Ratio | Color of Product | Percent Fe | Percent $P_2O_5$ |
|---|---|---|---|---|
| 2.2 | 1.04/3 | light buff | 0.018 | 0.074 |
| 2.7 | 1.04/3 | buff | 0.028 | 0.17 |
| 4.0 | 1.04/3 | buff | 0.036 | 0.25 |
| 5.7 | 1.04/3 | reddish | 0.03 | 0.30 |
| 5.4 | 0.83/3 | reddish | 0.048 | 0.28 |
| 2.9 | 0.83/3 | light buff | 0.026 | 0.086 |
| 1.9 | 0.83/3 | light buff | 0.028 | 0.05 |
| 8.1 | 0.77/3 | white | 0.050 | 0.26 |
| 6.7 | 0.77/3 | white | 0.046 | 0.25 |
| 3.9 | 0.77/3 | white | 0.045 | 0.17 |

We have thus demonstrated a process showing a substantial improvement over prior art methods of preparing synthetic cryolite from impure raw materials. For the first time, we have made available a product from such raw materials which is competitive with natural or artificial products prepared from impurity-free reactants. Using the preferred embodiment of our invention involving both pH and stoichiometric control we can produce substantially white, impurity-free cryolite from reaction mixtures having a final pH of below about 2. Such a technique is obviously superior to the other embodiment (acidulating the reaction mixture to a final pH of below about 1), since it results in a significant saving in raw material coupled with a mitigation of a serious corrosion problem. Solutions containing $Cl^-$, $F^-$, $SO_4^-$, $H^+$ and $Na^+$ ions become increasingly corrosive as the concentration of $H^+$ ions increases. By reducing the pH from 2 to 1 this problem becomes acute and special expensive acid resistant alloys are required as materials of construction for process equipment.

We claim:

1. A process for the manufacture of synthetic cryolite comprising providing impure aqueous solutions of $AlF_3$ and $NH_4F$ contaminated with a minor portion of phosphorous compounds, pretreating the $NH_4F$ solution with a quantity of strong mineral acid before admixing said $AlF_3$ therewith to provide at all times in the reaction mixture an excess of hydrogen ions, admixing said $AlF_3$ with a stoichiometric excess of said $NH_4F$ thereby lowering the pH, treating said admixed solutions with a quantity of a compound selected from the group consisting of sodium chloride and sodium carbonate whereby the pH of the reaction mixture is lowered to about 1.0 and a synthetic cryolite containing less than about 0.05% $P_2O_5$ impurity is precipitated therefrom.

2. A process for the manufacture of synthetic cryolite comprising providing impure aqueous solutions of $AlF_3$ and $NH_4F$ contaminated with phosphorous compounds, pretreating one of said solutions with a quantity of an acid selected from the group consisting of sulphuric and hydrochloric acids before admixing said $AlF_3$ with said $NH_4F$ so that the final pH of the cryolite reaction mixture is below about 2.0, admixing said $AlF_3$ with a stoichiometric excess of $NH_4F$, treating said admixed solution with a compound selected from the group consisting of sodium chloride and $Na_2CO_3$ whereby the pH of the reaction mixture is lowered to about 2.0 and a synthetic cryolite containing less than about 0.05% $P_2O_5$ impurity is precipitated from said reaction mixture, digesting said mixture for 30 to 45 minutes at a temperature below the boiling point of said mixture, separating said cryolite from said mixture, and thereafter drying and calcining said cryolite to obtain a substantially white impurity-free product.

3. In a precipitation step, wherein $AlF_3$ and $NH_4F$ are reacted as impure solutions contaminated with phosphorous compounds to produce $(NH_4)_3AlF_6$ and this product is further treated with a compound selected from the group consisting of sodium chloride and sodium carbonate to produce $Na_3AlF_6$ the improvement comprising maintaining at all times an excess of hydrogen ions in the reaction mixture so that the final pH of said mixture is below about 2, providing in said mixture a slight excess of free $NH_4F$ to react with heavy metal impurities thereby forming soluble complexes and avoiding the formation of impure heavy metal phosphorus compounds which contaminate and impart color to the finished product.

4. In a process for the manufacture of synthetic cryolite wherein an impure aqueous aluminum fluoride solution is treated with an impure aqueous solution of ammonium fluoride complemented with a compound selected from the group consisting of sodium chloride and sodium carbonate, said impure aqueous solutions being contaminated with a minor portion of phosphorous compounds, the improvement comprising pretreating the ammonium fluoride solution with a quantity of a strong mineral acid before admixing with said aluminum fluoride, admixing said aluminum fluoride with a stoichiometric excess of said acid-treated ammonium fluoride solution whereby the final pH of the admixed solutions is below about 2.0 and a synthetic cryolite containing less than about 0.05% $P_2O_5$ impurity is precipitated from the reaction mixture, digesting said mixture for a short period of time at an elevated temperature, separating said cryolite from said mixture, and thereafter drying and calcining said cryolite to obtain a substantially impurity-free product.

5. In a precipitation step wherein aluminum fluoride and ammonium fluoride are reacted as impure solutions contaminated with a minor portion of phosphorous compounds and the product of said reaction is further reacted with a compound selected from the group consisting of sodium carbonate and sodium chloride, the improvement comprising pretreating one of the fluorine-containing reactants with a sufficient excess of a strong mineral acid to maintain therein an acid pH after said fluorine-containing reactants are comixed, providing in the mixture of said fluorine-containing reactants an excess of ammonium fluoride by admixing said ammonium fluoride with less than a stoichiometric quantity of aluminum fluoride thereby forming in solution soluble heavy metal complexes and avoiding the formation of insoluble colloidal heavy metal phosphates which contaminate and impart color to the final product, and further providing through the aforementioned acid treatment a pH of below about 2 in the ultimate reaction mixture wherein all of the reactants are comixed.

References Cited in the file of this patent
UNITED STATES PATENTS

| | | |
|---|---|---|
| 1,475,155 | Howard | Nov. 20, 1923 |
| 1,475,158 | Howard | Nov. 20, 1923 |
| 1,850,017 | Lehrecke | Mar. 15, 1932 |
| 2,573,282 | Sciacca et al. | Oct. 30, 1951 |
| 2,780,524 | Gloss et al. | Feb. 5, 1957 |

OTHER REFERENCES

J. W. Mellor's "A Comprehensive Treatise on Inorganic and Theoretical Chemistry," vol. 5, 1924 ed., pages 303 and 305. Longmans, Green and Co., N.Y.